(12) United States Patent
Yumiba et al.

(10) Patent No.: US 7,400,725 B1
(45) Date of Patent: Jul. 15, 2008

(54) INFORMATION RECORDING MEDIUM FOR RECORDING A SCRAMBLED PART OF CONTENT INFORMATION, AND METHOD AND APPARATUS FOR REPRODUCING INFORMATION RECORDED THEREIN

(75) Inventors: Takashi Yumiba, Kyoto (JP); Hideshi Ishihara, Osaka (JP); Yoshihisa Fukushima, Osaka (JP); Makoto Tatebayashi, Hyogo (JP); Kaoru Yokota, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 735 days.

(21) Appl. No.: 09/670,119

(22) Filed: Sep. 26, 2000

(30) Foreign Application Priority Data

Sep. 30, 1999 (JP) ............................... P11-280075

(51) Int. Cl.
| | |
|---|---|
| *H04N 7/167* | (2006.01) |
| *G06F 11/30* | (2006.01) |
| *G06F 12/14* | (2006.01) |
| *H04L 9/32* | (2006.01) |
| *H04L 9/00* | (2006.01) |
| *H04K 1/00* | (2006.01) |
| *H04J 3/16* | (2006.01) |
| *H04J 3/22* | (2006.01) |

(52) U.S. Cl. .................. 380/201; 380/203; 380/45; 380/239; 380/241; 380/228; 380/229; 380/230; 380/234; 713/193; 713/194

(58) Field of Classification Search ................. 380/201, 380/203, 286, 206, 3, 4–46; 713/193
See application file for complete search history.

(56) References Cited

U.S. PATENT DOCUMENTS 5,917,910 A * 6/1999 Ishiguro et al. ............... 705/57
6,021,199 A * 2/2000 Ishibashi .................... 380/217

(Continued)

FOREIGN PATENT DOCUMENTS

EP 0 802 535 10/1997

(Continued)

*Primary Examiner*—Ayaz Sheikh
*Assistant Examiner*—Shin-Hon Chen
(74) *Attorney, Agent, or Firm*—Wenderoth, Lind & Ponack, L.L.P.

(57) ABSTRACT

An information recording medium, such as an optical disk or the like, is provided for recording at least copyrighted content information and cipher key information. A part of the content information is scrambled and recorded in the information recording medium, and the scrambled and recorded part of the content information is obtained through scrambling using scramble key information, which is obtained by converting the cipher key information by the use of a non-scrambled part of the content information. The information recording medium has a recording area divided into a plurality of sectors. A plurality of data which the content information is divided into is recorded in the sectors. The non-scrambled part of the content information includes copy control information and a part of the content information that changes sector by sector.

3 Claims, 7 Drawing Sheets

U.S. PATENT DOCUMENTS

| | | | | |
|---|---|---|---|---|
| RE37,052 E | * | 2/2001 | Park | 380/203 |
| 6,266,481 B1 | * | 7/2001 | Lee et al. | 386/94 |
| 6,343,281 B1 | | 1/2002 | Kato | |
| 6,347,846 B1 | * | 2/2002 | Nakamura | 380/203 |
| 6,535,858 B1 | * | 3/2003 | Blaukovitsch et al. | 705/57 |
| 6,611,534 B1 | * | 8/2003 | Sogabe et al. | 370/471 |
| 6,694,023 B1 | * | 2/2004 | Kim | 380/203 |
| 6,832,319 B1 | * | 12/2004 | Bell et al. | 713/193 |
| 7,031,470 B1 | * | 4/2006 | Bar-On | 380/203 |
| 2001/0019615 A1 | * | 9/2001 | Kato et al. | 380/286 |

FOREIGN PATENT DOCUMENTS

| | | |
|---|---|---|
| EP | 0802535 | 10/1997 |
| JP | 7-249264 | 9/1995 |
| JP | 11-39795 | 2/1999 |
| JP | 408290 | 10/2000 |
| WO | 97/14147 | 4/1997 |

\* cited by examiner

INFORMATION RECORDING MEDIUM FOR RECORDING A SCRAMBLED PART OF CONTENT INFORMATION, AND METHOD AND APPARATUS FOR REPRODUCING INFORMATION RECORDED THEREIN

BACKGROUND OF THE INVENTION

1. Field of the Invention

The present invention relates to an information recording medium for recording video information, audio information or the like, a method for reproducing information recorded in the information recording medium, and an apparatus for reproducing information recorded in the information recording medium. In particular, the present invention relates to an information recording medium in which copyrighted content information is recorded, a method for reproducing copyrighted content information recorded in the information recording medium, and an apparatus for reproducing copyrighted content information recorded in the information recording medium.

2. Description of the Related Art

Recently, recording mediums, each for recording an analog signal, such as a compact cassette tape, an analog record and the like, have been replaced as the mainstream of recording mediums for audio information by a recording medium for recording a digital signal, such as a CD (Compact Disc), a MD (Mini Disc) and the like. Moreover, the digital recording mediums, such as a video CD for recording a video signal compressed by a compression method called MPEG1 on a CD, and a DVD (Digital Video Disc) for recording a video signal compressed by a high-quality compression method called MPEG2 on an optical disk having a large capacity of 4.7 GB, have been developed as recording mediums for recording a video signal. These digital recording mediums have been commercialized as recording mediums for recording video information and audio information.

FIG. 7 is a block diagram showing an internal configuration of an optical disk reproducing apparatus 400 of a first prior art. The optical disk reproducing apparatus 400 executes error correction and expansion processes on information data read out from an optical disk 201, thereby decoding and outputting desired video and audio signals.

Referring to FIG. 7, the optical disk reproducing apparatus 400 is equipped with the optical disk 201. The optical disk reproducing apparatus 400 is constituted by a spindle motor 202, an optical head 203, a head amplifier 204, an analog processor 205, an optical disk controller 206, an error correction memory 207, an audio and video decoder 209 (hereinafter referred to as an AV decoder), an audio and video signal processing memory 210 (hereinafter referred to as an AV signal processing memory), a servo controller 211, a CPU 212, and a CPU bus 213.

The spindle motor 202 rotates the optical disk 201 in accordance with a control signal from the servo controller 211. The optical head 203 comprises an optical pickup. The optical head 203 irradiates the optical disk 201 with laser light generated by driving a laser diode. The optical head 203 detects the reflected light from the optical disk 201, and then, executes photoelectric conversion on the reflected light. Then, the optical head 203 outputs a reproduced signal subjected to photoelectric conversion to the analog processor 205 through the head amplifier 204. The analog processor 205 has facilities for AGC, equalizing, data slice, and PLL. The analog processor 205 applies predetermined analog signal processing to the input reproduced signal, and then outputs the processed reproduced signal to the optical disk controller 206. Subsequently, the optical disk controller 206 converts the input reproduced signal into reproduced digital data through A/D conversion, and then demodulates the reproduced data. The optical disk controller 206 applies error correction and the like to the demodulated reproduced data by using the error correction memory 207 as a buffer memory.

Then, the optical disk controller 206 outputs the processed reproduced data to the AV decoder 209. Furthermore, the AV decoder 209 applies decoding including expansion to video data and audio data, which are compressed into the above-mentioned input reproduced data, by using the AV signal processing memory 210 that is an expansion buffer memory for use in expansion of video data and audio data, in accordance with the input reproduced data. Then, the AV decoder 209 outputs the processed video and audio signals.

The servo controller 211 controls the spindle motor 202, the optical head 203, the optical disk controller 206 and so on in accordance with the signals from the analog processor 205, the optical disk controller 206 and the CPU 212, to perform servo control of focusing, tracking or the like of the optical head 203 for readout of data from the optical disk 201, or the like. The servo controller 211, the analog processor 205, the optical disk controller 206 and the AV decoder 209 are connected to the CPU 212 through the CPU bus 213. The CPU 212 controls the analog processor 205, the optical disk controller 206, the AV decoder 209 and the servo controller 211 through the CPU bus 213, to control operation of the overall optical disk reproducing apparatus 400.

An operation of the optical disk reproducing apparatus of the first prior art will be briefly described with reference to FIG. 7. The CPU 212 controls the optical head 203 in accordance with a predetermined sequence so as to read out data from the optical disk 201 by using the optical head 203, then output the reproduced data to the optical disk controller 206 through the head amplifier 204 and the analog processor 205, and then store the reproduced data subjected to error correction in the error correction memory 207. At that time, the CPU 212 reads out control information and data identification information in the reproduced data stored in the error correction memory 207, and thus controls the servo controller 211 and the AV decoder 209, thereby reproducing video data and audio data.

On the other hand, the capacity of an application program for a personal computer has also increased in accordance with an improvement in performance of the personal computer and an increase in the capacity of a hard disk. A DVD is used, by making use of its large capacity, not only as a recording medium for recording video data and audio data, but also as a medium for distributing application software for the personal computer, or the like. Thus, a DVD drive unit is rapidly spreading as a peripheral unit of the personal computer. Furthermore, an AV decoder card having an MPEG expansion facility for the personal computer, a program for executing the MPEG expansion facility through software processing by a main processor of the personal computer and the like have been commercialized.

However, the DVD drive unit and the AV decoder card are connected through a communication line of a general computer bus in a system in which the personal computer reproduces video data and audio data from the DVD by using the DVD drive unit and the AV decoder card. Thus, acts, such as piracy of data transmitted through the communication line and distribution of tampered data, take place. Consequently, there is such a problem in that it is very difficult to protect the copyright thereof.

In order to solve the above-mentioned problems, encryption and recording of copyrighted data have been proposed in Japanese patent laid-open publication No. 7-249264 (hereinafter referred to as a second prior art), for example. Proposed is a method in which a cipher key is recorded in a main data area of a different sector from an encrypted data sector in a CD-ROM of the second prior art. In the second prior art, data encrypted at the time of recording and a cipher key of the data are recorded in the CD-ROM. At the time of reproducing, a personal computer issues a command to read a cipher key to a reproducing apparatus, then encrypted data is read out, and the encrypted data is decrypted by using the cipher key previously read out, and this leads to the data being reproduced.

However, in the second prior art, the cipher key is recorded in the main data area of the sector from which the cipher key can be read out by a general read command. Thus, the cipher key can be easily read out by a general personal computer. Therefore, a user can read out the cipher key and encrypted data. Thus, the second prior art has a problem in that it involves a high risk of decryption. The second prior art has another problem that a pirated copy can be made by copying the cipher key and the encrypted data in a hard disk memory, for example.

Moreover, all the main data areas of the sector are encrypted and recorded. Thus, when a CPU of, for example, a DVD player attempts to read out content control information, which is included in main data of the sector and includes content identification information, content copy control information and so on, from an optical disk in order to control the DVD player, the CPU can obtain correct information only after decrypting data once encrypted.

The above-mentioned problem causes the following problem. When the area containing the content control information is recorded in a form of plain text, unauthorized reproducing takes place in the case where the copy control information is tampered with.

SUMMARY OF THE INVENTION

In order to solve the foregoing problems, it is an object of the present invention to provide an information recording medium having a data structure for preventing easy readout of key information for use in descrambling.

In order to solve the foregoing problems, it is another object of the present invention to provide an information recording medium in which a CPU for controlling an information reproducing apparatus, such as a DVD player, can easily read out copy control information or the like from the information recording medium and thus easily control the information reproducing apparatus, and reproducing of data can be prevented when the copy control information or the like recorded in the information recording medium is tampered with.

In order to solve the foregoing problems, it is a further object of the present invention to provide a method and an apparatus for reproducing information stored in an information recording medium, in which a CPU for controlling an information reproducing apparatus, such as a DVD player, can easily read out copy control information or the like from an information recording medium and thus easily control the information reproducing apparatus, and reproducing of data can be prevented when the copy control information or the like recorded in the information recording medium is tampered with.

In order to achieve the aforementioned objective, according to one aspect of the present invention, there is provided an information recording medium for recording at least copyrighted content information and cipher key information, wherein a part of the content information is scrambled and recorded in the information recording medium, and wherein the scrambled and recorded part of the content information is obtained through scrambling using scramble key information, which is obtained by converting the cipher key information by the use of a non-scrambled part of the content information.

In the above-mentioned information recording medium, the non-scrambled part of the content information for generating the scramble key information preferably includes at least copy control information.

In the above-mentioned information recording medium, the information recording medium preferably comprises a recording area divided into a plurality of sectors, wherein a plurality of data which the content information is divided into are recorded in the sectors, respectively, and wherein the non-scrambled part of the content information for generating the scramble key information includes the copy control information, and a part of the content information that changes sector by sector.

According to another aspect of the present invention, there is provided a method for reproducing information recorded in an information recording medium for recording at least cipher key information and content information, a part of the content information being scrambled and recorded in the information recording medium, the method including the steps of:

decoding the cipher key information recorded in the information recording medium into decoded key information by using predetermined key information;

converting the decoded key information into converted decoded key information by using non-scrambled content information of the content information; and descrambling the scrambled and recorded content information by using the converted decoded key information.

According to a further aspect of the present invention, there is provided an apparatus for reproducing information recorded in an information recording medium for recording at least cipher key information and content information, a part of the content information being scrambled and recorded, the apparatus comprising:

cipher key information decoding means for decoding the cipher key information recorded in the information recording medium into decoded key information by using predetermined key information;

key information converting means for converting the decoded key information outputted from the cipher key information decoding means, into converted decoded key information by using non-scrambled content information of the content information; and descrambling means for descrambling the scrambled and recorded content information by using the converted key information outputted from the key information converting means.

According to a still further aspect of the present invention, there is provided an information recording medium having at least a data recording area for recording copyrighted content information, wherein at least cipher key information and the content information are recorded in the data recording area, wherein a part of the content information recorded in the data recording area is scrambled and recorded, and wherein the scrambled and recorded part of the content information is obtained through scrambling using scramble key information, which is obtained by converting the cipher key information by the use of a non-scrambled part of the content information.

According to a still further aspect of the present invention, there is provided an information recording medium having at least a data recording area and a lead-in area, copyrighted content information being recorded in the information recording medium, wherein at least first cipher key information and the content information are recorded in the data recording area, wherein second cipher key information is recorded in the lead-in area, wherein a part of the content information recorded in the data recording area is scrambled and recorded, and wherein the scrambled and recorded content information is obtained through scrambling using scramble key information, which is obtained by converting the second cipher key information by the use of a non-scrambled part of the content information.

In the above-mentioned information recording medium, the non-scrambled part of the content information for generating the scramble key information preferably includes at least copy control information.

In the above-mentioned information recording medium, the information recording medium preferably has a recording area divided into a plurality of sectors, wherein a plurality of data which the content information is divided into are recorded in the sectors, respectively, and wherein the non-scrambled part of the content information for generating the scramble key information includes the copy control information, and a part of the content information that changes sector by sector.

According to a still further aspect of the present invention, there is provided a method for reproducing information recorded in an information recording medium having at least a data recording area and a lead-in area, at least first cipher key information and content information being recorded in the data recording area, second cipher key information being recorded in the lead-in area, and a part of the content information recorded in the data recording area being scrambled and recorded, the method including the steps of:

decoding the first cipher key information stored in the data recording area into first key information by using predetermined key information;

decoding the second cipher key information stored in the lead-in area into second key information by using the first key information; converting the second key information into converted second key information by using non-scrambled content information stored in the data recording area; and descrambling the scrambled and recorded content information by using the converted second key information.

According to a still further aspect of the present invention, there is provided an apparatus for reproducing information recorded in an information recording medium having at least a data recording area and a lead-in area, at least first cipher key information and content information being recorded in the data recording area, second cipher key information being recorded in the lead-in area, and a part of the content information recorded in the data recording area being scrambled and recorded, the apparatus comprising:

first key information decoding means for decoding the first cipher key information stored in the data recording area into first key information by using predetermined key information;

second key information decoding means for decoding the second cipher key information stored in the lead-in area into second key information by using the first key information outputted from the first key information decoding means;

key converting means for converting the second key information outputted from the second key information decoding means into converted second key information by using non-scrambled content information of the content information; and descrambling means for descrambling the scrambled and recorded content information by using the converted second key information outputted from the key converting means.

In the above-mentioned apparatus, the non-scrambled content information for converting the second key information into the converted second key information preferably includes at least copy control information.

According to a further aspect of the present invention, there is provided an information recording medium having at least a lead-in area and a data recording area, copyrighted content information being recorded in the information recording medium, wherein first cipher key information is recorded in the lead-in area, wherein at least second cipher key information and the content information are recorded in the data recording area, wherein a part of the content information recorded in the data recording area is scrambled and recorded, and wherein the scrambled and recorded content information is obtained through scrambling using scramble key information, which is obtained by converting the second cipher key information by the use of a non-scrambled part of the content information.

In the above-mentioned information recording medium, the data recording area is preferably divided into a plurality of sectors, each of which is composed of a sector header area for recording information for identifying the sector, and a main data area for recording the content information, wherein the second cipher key information is recorded in the sector header area, wherein a part of the content information is scrambled and recorded in the main data area, and wherein the scrambled and recorded part of the content information is obtained through scrambling using scramble key information, which is obtained by converting the second cipher key information by the use of a non-scrambled part of the content information for each sector.

In the above-mentioned information recording medium, the non-scrambled part of the content information for generating the scramble key information preferably includes at least copy control information.

In the above-mentioned information recording medium, the non-scrambled part of the content information for generating the scramble key information preferably includes at least the copy control information, and a part of the content information that changes sector by sector.

In the above-mentioned information recording medium, the second cipher key information recorded in the sector header area is preferably information which is obtained by encrypting predetermined second key information by the use of the first cipher key information recorded in the lead-in area.

According to a still further aspect of the present invention, there is provided a method for reproducing information recorded in an information recording medium having at least a lead-in area and a data recording area, first cipher key information being recorded in the lead-in area, at least second cipher key information and content information being recorded in the data recording area, and a part of the content information recorded in the data recording area being scrambled and recorded in the information recording medium, the method including the steps of:

decoding the first cipher key information stored in the lead-in area into first key information by using predetermined key information; decoding the second cipher key information stored in the data recording area into second key information by using the first key information;

converting the second key information into converted second key information by using non-scrambled content information stored in the data recording area; and descrambling the scrambled and recorded content information by using the converted second key information.

According to a still further aspect of the present invention, there is provided an apparatus for reproducing information recorded in an information recording medium having at least a lead-in area and a data recording area, first cipher key information being recorded in the lead-in area, at least second cipher key information and content information being recorded in the data recording area, and a part of the content information recorded in the data recording area being scrambled and recorded in the information recording medium, the apparatus comprising:

first key information decoding means for decoding the first cipher key information stored in the lead-in area into first key information by using predetermined key information;

second key information decoding means for decoding the second cipher key information stored in the data recording area into second key information by using the first key information outputted from the first key information decoding means;

key information converting means for converting the second key information outputted from the second key information decoding means into converted second key information by using non-scrambled content information stored in the data recording area; and descrambling means for descrambling the scrambled and recorded content information by using the converted second key information outputted from the key information converting means.

In the above-mentioned apparatus, a non-scrambled part of the content information preferably includes at least copy control information.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

An optical disk, a method of reproducing information recorded in the optical disk and an apparatus for reproducing information recorded in the optical disk according to preferred embodiments of the present invention will be described below with reference to the accompanying drawings. Herein, optical disks include an optical disk, and a magneto-optical disk such as a CD, a video CD, a CD-ROM, a CD-R, a CD-RW, an MD, a DVD, a DVD-ROM, a DVD-RAM, a DVD-RW or the like.

First Preferred Embodiment

Figure 1:
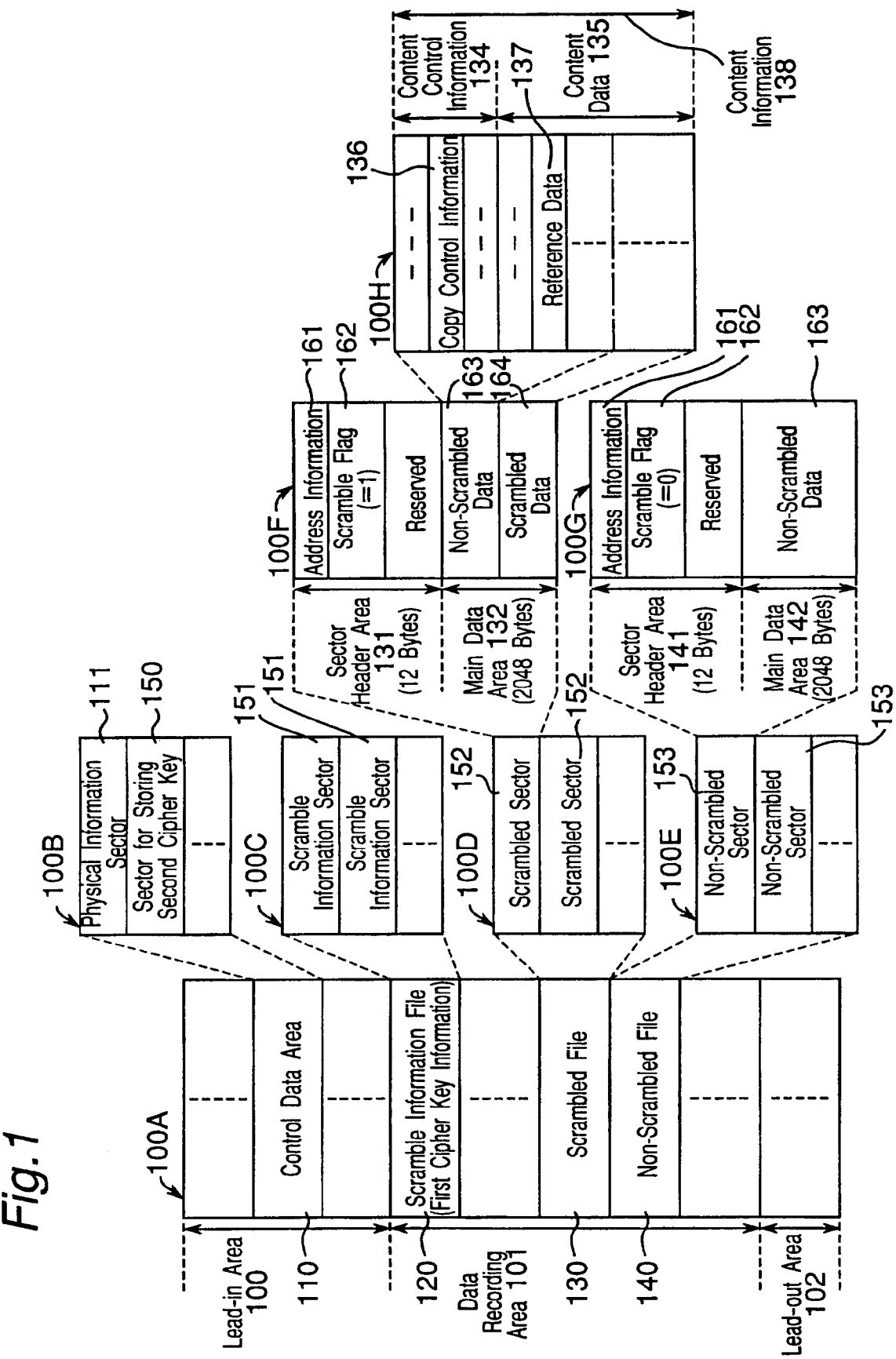
FIG. 1 is a hierarchy diagram showing a data structure of an optical disk 201 according to a first preferred embodiment of the present invention.
Figure 2:
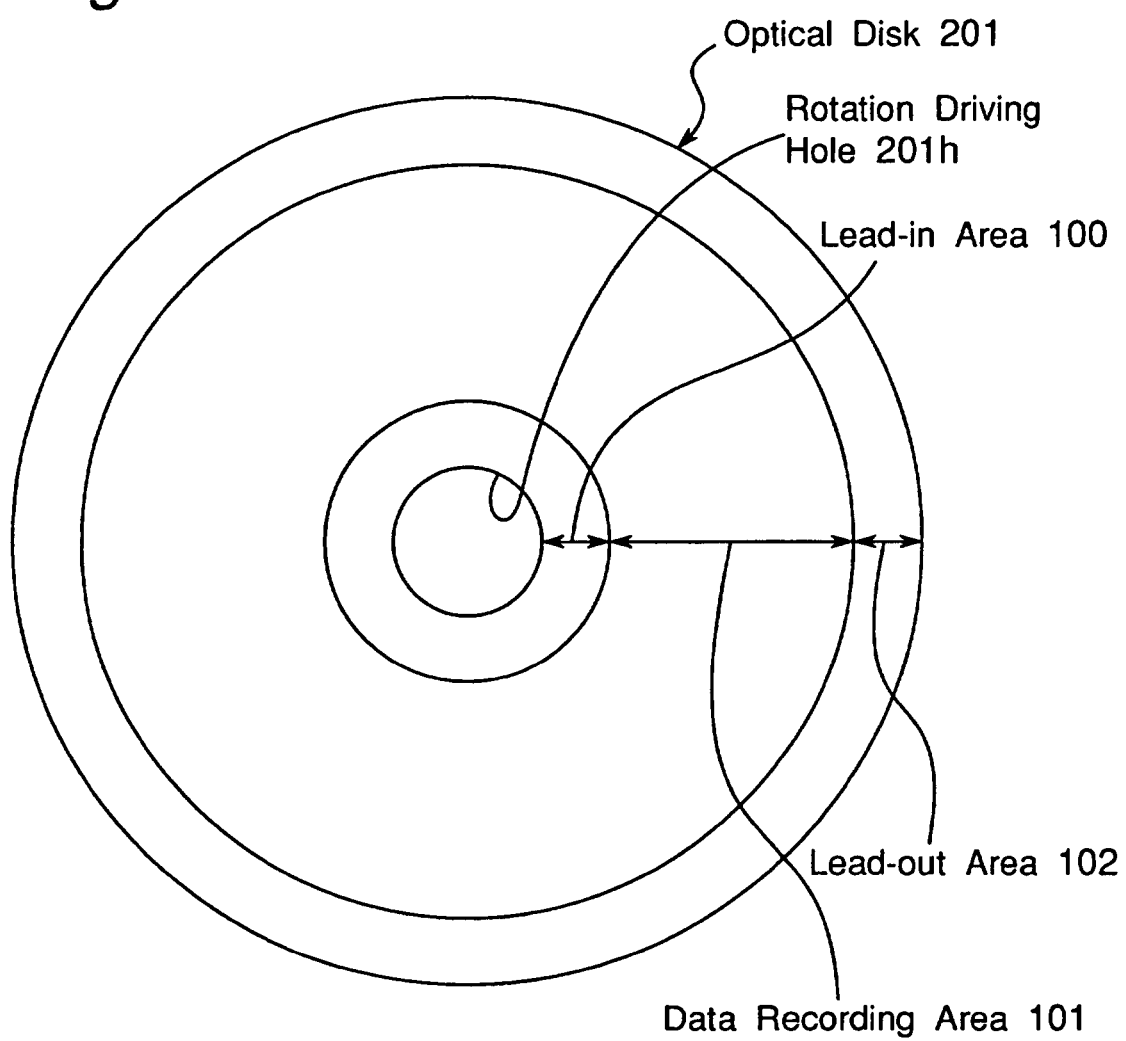
FIG. 2 is a plan view of recording areas of the optical disk 201 shown in FIG. 1.

FIG. 1 is a hierarchy diagram showing a data structure of an optical disk 201 according to a first preferred embodiment of the present invention, and FIG. 2 is a plan view of recording areas of the optical disk 201 shown in FIG. 1.

In FIG. 1, reference numeral 100A denotes a data structure of an information recording area of the whole optical disk 201, and the data structure 100A comprises a lead-in area 100 for recording control information, a data recording area 101 for recording content information 138 composed of content control information 134 and content data 135, and a lead-out area 102. As shown in FIG. 2, the optical disk 201 has a rotation driving hole 201h in the center thereof, and the lead-in area 100, the data recording area 101 and the lead-out area 102 are located in order from the inside of the optical disk 201 toward the outside thereof.

Figure 3:
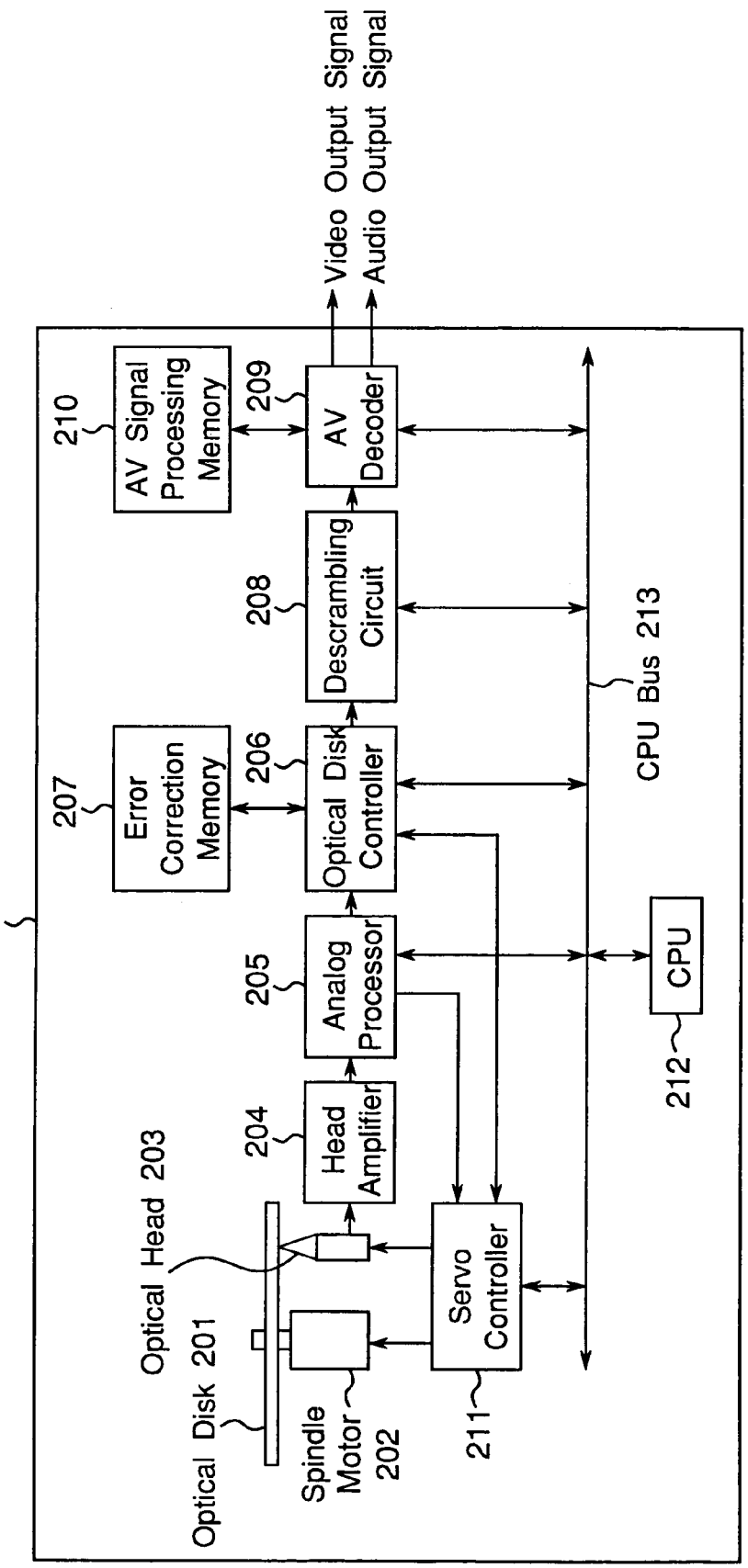
FIG. 3 is a block diagram showing an internal configuration of an optical disk reproducing apparatus 200 for reproducing information recorded in the optical disk 201 shown in FIGS. 1 and 2.

Referring to FIG. 1, the lead-in area 100 contains a control data area 110 for recording information required for an optical disk reproducing apparatus 200 shown in FIG. 3 to reproduce information from the optical disk 201. The control data area 110 comprises a physical information sector 111, a sector 150 for storing second cipher key information, and so on, as indicated by reference numeral 100B. Physical information about the optical disk 201, such as a disk diameter, a disk structure, a recording density and the like, is recorded in the physical information sector 111. Second cipher key information, which is obtained by encrypting predetermined second key information, is recorded in the sector 150 for storing second cipher key information.

A scramble information sector 151 for recording first cipher key information and the content information 138 such as a compressed movie, music or the like are scrambled, and then recorded as a scrambled file 130 in the data recording area 101. As indicated by reference numeral 100A of FIG. 1, the first cipher key information is recorded as a scramble information file 120 in the data recording area 101. Copyrighted content information 138 is scrambled and recorded as the scrambled file 130 in the data recording area 101. Copyright-free content information 138 is not scrambled and is recorded as a non-scrambled file 140 in the data recording area 101.

The data recording area 101 is partitioned into a plurality of units called sectors. That is, the data recording area 101 is divided into a plurality of sectors. As indicated by reference numerals 100C, 100D and 100E, the files 120, 130 and 140 recorded in the data recording area 101 comprise a plurality of scramble information sectors 151, a plurality of scrambled sectors 152 and a plurality of non-scrambled sectors 153, respectively. Each of the scrambled sectors 152 is composed of a sector header area 131 of 12 bytes for recording address information 161 and the like for identifying the sector, and a main data area 132 of 2048 bytes for recording the content information 138, as indicated by reference numeral 100F. Each of the non-scrambled sectors 153 is composed of a sector header area 141 of 12 bytes for recording the address information 161 and the like for identifying the sector, and a main data area 142 of 2048 bytes for recording the content information 138, as indicated by reference numeral 100G. Each scramble information sector 151 having a data structure indicated by reference numeral 100C. has a sector header area and a main data area, in a manner similar to that of each scrambled sector 152 and each non-scrambled sector 153.

Furthermore, a scramble flag 162, in addition to the above-mentioned address information 161, is recorded in each of the respective sector header areas 131 and 141 of the sectors 152 and 153. The scramble flags 162 recorded in the sector header areas 131 and 141 are flags for indicating whether or not predetermined areas of the respective main data areas 132 and 142 of the sectors 152 and 153 are scrambled. The scramble flag 162 of "1" is recorded in the scrambled sector having scrambled information, whereas the scramble flag 162 of "0" is recorded in the non-scrambled sector having non-scrambled information.

Furthermore, the second cipher key information stored in the sector 150 for storing second cipher key information, which is recorded in the lead-in area 100, is decoded into second key information by using first key information, which is obtained by decoding the first cipher key information contained in the scramble information file 120 of the data recording area 101 by the use of predetermined fixed key information. The second key information obtained through decoding is converted into descramble key information for use in descrambling of main data, by using copy control information 136 and reference data 137 stored in the content information 138.

In the preferred embodiment, the descramble key information is identical with scramble key information for use in encryption by a scrambling circuit corresponding to a descrambling circuit 208. The reference data 137 is a part of the content data 135.

As indicated by reference numeral 100H of FIG. 1, not all of the main data area 132 of the scrambled sector 152 is scrambled. The main data area 132, except for the area containing the content control information 134 and a part of the content data, is scrambled. The copy control information 136 contains information such as the limit of the number of copies of the content information 138 or the like, and downsampling control to be performed at the time of reproducing information stored in the optical disk. The scrambled content data is obtained by scrambling and recording a part of the content information 138 stored in a predetermined area by the use of scramble key information, which is the converted second key information, into which the second key information obtained through decoding is converted by using the copy control information 136 contained in the content control information 134 and a part of the compressed content data 135 (e.g., the reference data 137 in the data structure indicated by reference numeral 100H of FIG. 1).

FIG. 3 is a block diagram showing an internal configuration of the optical disk reproducing apparatus 200 for reproducing information recorded in the optical disk 201 shown in FIGS. 1 and 2. The optical disk reproducing apparatus 200 will be described below with reference to FIG. 3.

Figure 7:
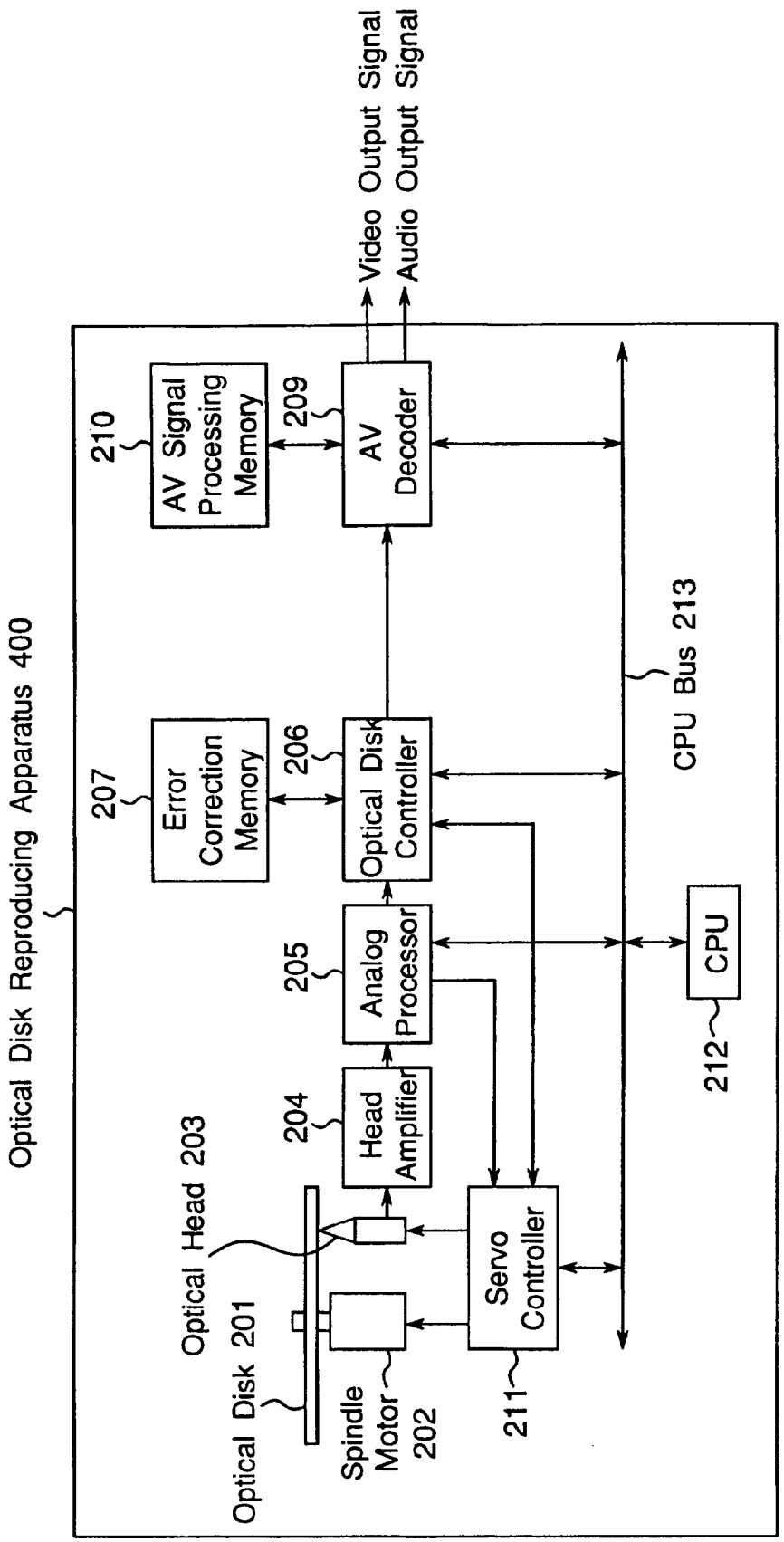
FIG. 7 is a block diagram showing an internal configuration of an optical disk reproducing apparatus 400 of the first prior art.

The optical disk reproducing apparatus 200 of the present preferred embodiment descrambles and expands reproduced data read out from the optical disk 201, thereby decoding and outputting desired video and audio signals. In FIG. 3, the components having the same configurations as those shown in FIG. 7 are indicated by the same reference numerals, and the detailed description thereof is omitted.

Referring to FIG. 3, the optical disk reproducing apparatus 200 is equipped with the optical disk 201. The optical disk reproducing apparatus 200 comprises a spindle motor 202, an optical head 203, a head amplifier 204, an analog processor 205, an optical disk controller 206, an error correction memory 207, the descrambling circuit 208, an AV decoder 209, an AV signal processing memory 210, a servo controller 211, a CPU 212, and a CPU bus 213. That is, the optical disk reproducing apparatus 200 shown in FIG. 3 is characterized in that the descrambling circuit 208 for descrambling scrambled and recorded information is interposed between the optical disk controller 206 and the AV decoder 209, as compared with an optical disk reproducing apparatus 400 shown in FIG. 7.

Referring again to FIG. 3, the optical disk controller 206 outputs processed reproduced data to the descrambling circuit 208. The descrambling circuit 208 descrambles the input processed reproduced data, and then outputs the descrambled reproduced data to the AV decoder 209. The servo controller 211, the analog processor 205, the optical disk controller 206, the descrambling circuit 208 and the AV decoder 209 are connected to the CPU 212 through the CPU bus 213. The CPU 212 controls the analog processor 205, the optical disk controller 206, the descrambling circuit 208, the AV decoder 209 and the servo controller 211 through the CPU bus 213, thereby controlling operation of the overall optical disk reproducing apparatus 200.

The first cipher key information stored in the scramble information file 120 recorded in the data recording area 101, the second cipher key information contained in the sector 150 for storing second cipher key information stored in the lead-in area 100, and the copy control information and the reference data 137 that are a part of the content information 138 are inputted to the descrambling circuit 208. The descrambling circuit 208 decodes the input first cipher key information into the first key information by using predetermined fixed key information. Then, the descrambling circuit 208 decodes the input second cipher key information into the second key information by using the above-mentioned first key information. Subsequently, the descrambling circuit 208 converts the above-mentioned second key information into the converted second key information, i.e., the descramble key information, by utilizing a predetermined transform equation such as a higher-order equation having, for example, two variables by the use of the input part of the content information 138. Furthermore, the descrambling circuit 208 descrambles main data in a plurality of scrambled sectors 152 having a data structure indicated by reference numeral 100D in FIG. 1 by using the above-mentioned descramble key information.

Figure 4:
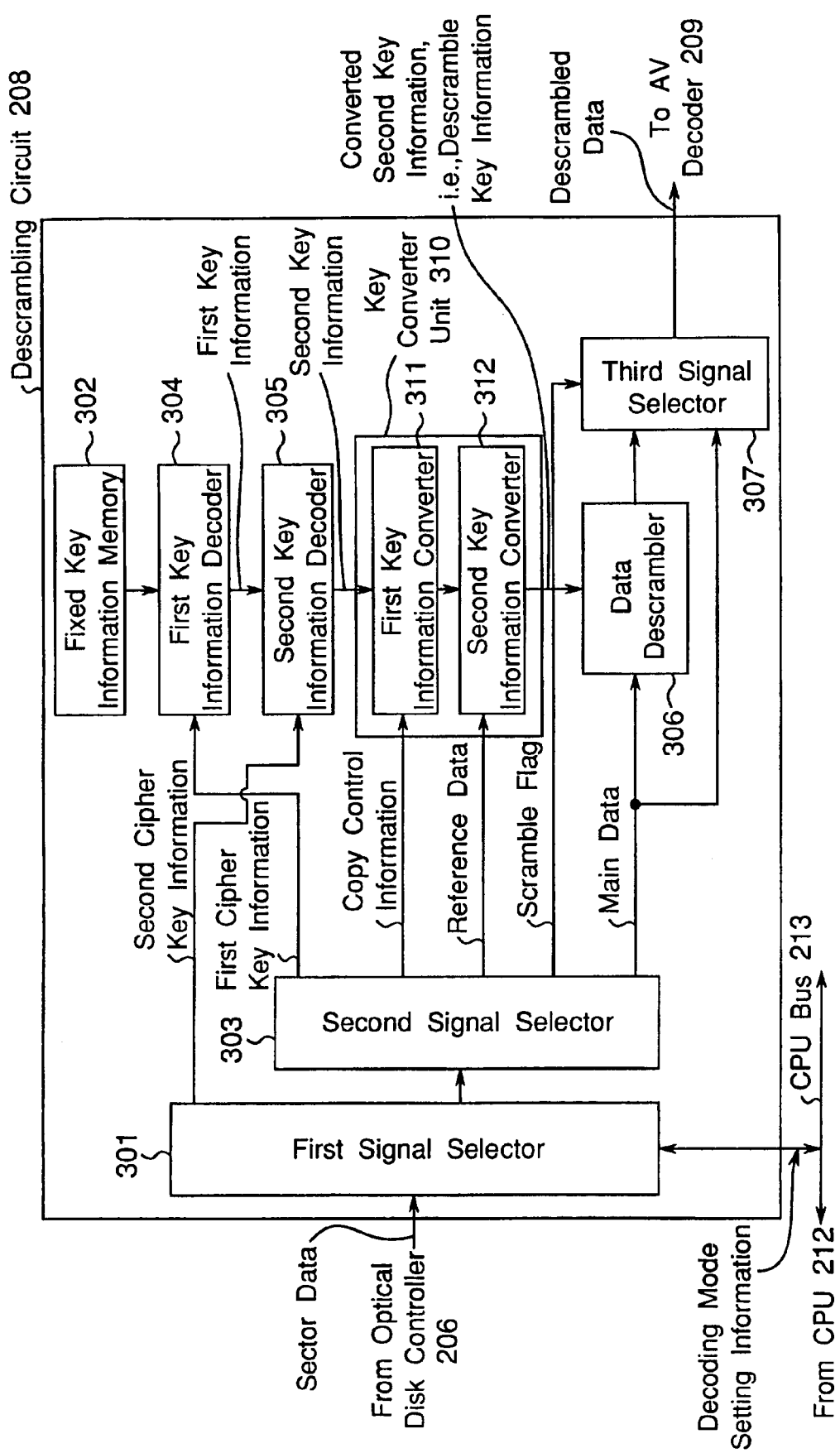
FIG. 4 is a block diagram showing an internal configuration of a descrambling circuit 208 shown in FIG. 3.

FIG. 4 is a block diagram showing an internal configuration of the descrambling circuit 208 shown in FIG. 3. The configuration and operation of the descrambling circuit 208 will be described below with reference to FIG. 4.

Referring to FIG. 4, the descrambling circuit 208 comprises a first signal selector 301, a fixed key information memory 302, a second signal selector 303, a first key information decoder 304, a second key information decoder 305, a data descrambler 306, a third signal selector 307, and a key converter unit 310 including a first key information converter 311 and a second key information converter 312. Each of the first, second and third signal selectors 301, 303 and 307 comprises a multiplexer or a switch circuit, for example.

Referring again to FIG. 4, the first signal selector 301 selects an internal circuit to which data inputted from the optical disk controller 206 to the descrambling circuit 208 is to be outputted, in accordance with the setting information of the decoding mode inputted from the CPU 212 through the CPU bus 213. Specifically, when the input data is the second cipher key information recorded in the lead-in area 100, the first signal selector 301 outputs the input second cipher key information to the second key information decoder 305. On the other hand, when the input data is sector data recorded in the data recording area 101, the first signal selector 301 outputs the input sector data to the second signal selector 303. The fixed key information memory 302 stores a predetermined fixed key for use in decoding of the first cipher key information. The sector data outputted from the first signal selector 301 is inputted to the second signal selector 303. The second signal selector 303 selects a circuit to which the sector data is to be outputted, in accordance with the location of the sector data in the sector, i.e., the count of the number of sector data. As shown in FIG. 1, the type of the sector data recorded in the data recording area 101 is determined in accordance with the location of the sector data in the sector. Thus, in accordance with the count of the number of sector data, as shown in FIG. 4, the second signal selector 303 performs the following operation of:

(a) outputting the input first cipher key information to the first, key information decoder 304 when the input sector data is the first cipher key information;

(b) outputting input copy control data to the first key information converter 311 of the key converter unit 310 when the input sector data is the copy control data;

(c) outputting the input reference data to the second key information converter 312 of the key converter unit 310 when the input sector data is the reference data;

(d) outputting the input scramble flag to the third signal selector 307 when the input sector data is the scramble flag; or (e) outputting the input main data to the data descrambler 306 and the third signal selector 307 when the input sector data is the main data.

The first key information decoder 304 decodes the first cipher key information contained in the scramble information file 120 of the data recording area 101 outputted from the second signal selector 303, by a decoding method using a cryptosystem which has been already known to those skilled in the art, such as the DES cryptosystem, the RSA cryptosystem or the like, by the use of the fixed key information read out from the fixed key information memory 302. Thus, the first key information decoder 304 decodes the first cipher key information into the first key information, and then, outputs the decoded first key information to the second key information decoder 305. Subsequently, the second key information decoder 305 decodes the second cipher key information stored in the sector 150 for storing second cipher key information stored in the lead-in area 100 inputted from the first signal selector 301, by a decoding method using a cryptosystem which has been already known to those skilled in the art, such as the DES cryptosystem, the RSA cryptosystem or the like, in a manner similar to that of the first key information decoder 304 by the use of the first key information which is obtained through decoding and outputted from the first key information decoder 304. Thus, the second key information decoder 305 decodes the second cipher key information into the second key information, and outputs the second key information to the first key information converter 311 of the key converter unit 310.

The key converter unit 310 comprises the first and second key information converters 311 and 312. The key converter unit 310 converts the second key information outputted from the second key information decoder 305 into the converted second key information, i.e., the descramble key information, by using the copy control information and the reference data outputted from the second signal selector 303. Then, the key converter unit 310 outputs the descramble key information to the data descrambler 306. The first key information converter 311 converts the second key information outputted from the second key information decoder 305 into the second key information subjected to first key information conversion, by utilizing a predetermined first transform equation such as a predetermined higher-order equation, e.g., a method in which two input data are substituted into a higher-order equation having two variables so as to calculate a value of the higher-order equation, by the use of the copy control information outputted from the second signal selector 303. Then, the first key information converter 311 outputs the converted second key information to the second key information converter 312. Subsequently, the second key information converter 312 converts the second key information, which is subjected to first key information conversion and outputted from the first key information converter 311, into the second key information subjected to second key information conversion, i.e., the converted second key information, by utilizing a predetermined second transform equation such as a predetermined higher-order equation, e.g., a method in which two input data are substituted into a higher-order equation having two variables so as to calculate a value of the higher-order equation in a manner similar to that of the first key information converter 311, by the use of the reference data outputted from the second signal selector 303. Then, the second key information converter 312 outputs the converted second key information to the data descrambler 306.

The data descrambler 306 descrambles the main data outputted from the second signal selector 303 by using the descramble key information outputted from the second key information converter 312 of the key converter unit 310. Thus, the data descrambler 306 generates the descrambled main data, and outputs the descrambled main data to the third signal selector 307. Data descrambling is executed in the following manner: a pseudo random pattern signal having a predetermined length, such as an M-series signal or the like, is generated by using a shift register having a finite length and an adder in a manner similar to that of a transmitter side, and then the exclusive OR of the generated pseudo random pattern signal and the input data is calculated.

Subsequently, the third signal selector 307 selects either non-descrambled main data outputted from the second signal selector 303 or descrambled main data outputted from the data descrambler 306 in accordance with the scramble flag outputted from the second signal selector 303 and the count of the number of sector data counted in the third signal selector 307. Then, the third signal selector 307 outputs the selected main data to the AV decoder 209. When the scramble flag is equal to "1" and the count does not indicate a storage area for non-scrambled data 163, i.e., when the main data is scrambled, the third signal selector 307 selects the descrambled main data outputted from the data descrambler 306, and outputs the descrambled main data to the AV decoder 209. On the other hand, when the scramble flag is equal to "1" and the count indicates the storage area for the non-scrambled data 163, or when the scramble flag is equal to "0", i.e., when the main data is not scrambled, the third signal selector 307 selects the non-descrambled main data outputted from the second signal selector 303, and outputs the non-descrambled main data to the AV decoder 209.

An operation of the optical disk reproducing apparatus 200 according to the preferred embodiment configured as described above will be described with reference to FIGS. 3 and 4.

When the optical disk 201 is inserted into the optical disk reproducing apparatus 200 upon power-on, or when the optical disk 201 is newly inserted into the optical disk reproducing apparatus 200, the CPU 212 controls the servo controller 211 so that the optical head 203 may read out from the optical disk 201 information data stored in the sector 150 for storing second cipher key information stored in the control data area 110 in the lead-in area 100 of FIG. 1. An electric signal of the readout information data is amplified, demodulated and subjected to error correction by the head amplifier 204, the analog processor 205 and the optical disk controller 206, respectively. Then, the CPU 212 controls the error correction memory 207 to store data on the processed second cipher key information therein.

Subsequently, the CPU 212 controls the servo controller 211 so as to read out the sector storing the scramble information file (first cipher key information) 120 of FIG. 1 from the optical disk 201. An electric signal of readout information data is amplified, demodulated and subjected to error correction by the head amplifier 204, the analog processor 205 and the optical disk controller 206, respectively. At that time, in the descrambling circuit 208, a mode of decoding the first cipher key information is set in accordance with the decoding mode setting information from the CPU 212. The first cipher key information inputted from the optical disk controller 206 is transferred to the first key information decoder 304 by the first signal selector 301 and the second signal selector 303. Then, the transferred first cipher key information is decoded by the first key information decoder 304 using the fixed key information read out from the fixed key information memory 302. Then, the first key information obtained through decoding is outputted to the second key information decoder 305. In the mode of decoding the first cipher key information into the first key information, no data is outputted from the descrambling circuit 208.

Subsequently, the second cipher key information already stored in the error correction memory 207 is read out and outputted to the second key information decoder 305 through the first signal selector 301 of the descrambling circuit 208. As described above, the first key information already obtained through decoding by the first key information decoder 304 is inputted to the second key information decoder 305. The second key information decoder 305 decodes the input second cipher key information by using the first key information obtained through decoding. Thus, the second key information decoder 305 decodes the second cipher key information into the second key information, and outputs the second key information to the first key information converter 311 of the key converter unit 310.

Next, an operation of selecting a file in accordance with operation by an apparatus user or the like, and then reproducing a video signal and an audio signal will be described.

The CPU 212 controls the servo controller 211, the optical head 203, the analog processor 205 and the optical disk controller 206, thereby reading out desired information data from the optical disk 201 and causing the error correction memory 207 to store the information data subjected to error correction. Moreover, the CPU 212 sets a mode of descrambling data for the descrambling circuit 208. The CPU 212 sets the information required for the AV decoder 209, and then controls the error correction memory 207 to transfer the information data subjected to error correction to the descrambling circuit 208.

In the descrambling circuit 208, the mode of descrambling data is set as the decoding mode setting information. Thus, the input sector data is transferred to the second signal selector 303 by the first signal selector 301. The second signal selector 303 counts the number of input sector data, and outputs the input sector data in accordance with the count in the following manner.

(a) When the above-mentioned count indicates the data location containing the copy control information, the input sector data is outputted to the first key information converter 311.

(b) When the above-mentioned count indicates the data location containing the reference data, the input sector data is outputted to the second key information converter 312.

(c) When the above-mentioned count indicates the data location containing the main data, the input sector data is outputted to the data descrambler 306 and the third signal selector 307.

The second key information, which is obtained through decoding and outputted from the second key information decoder 305, is converted into the second key information subjected to first key information conversion by the first key information converter 311 by the use of the copy control information contained in the main data. Then, the converted second key information is outputted to the second key information converter 312. Subsequently, the second key information, which is subjected to first key information conversion and outputted from the first key information converter 311, is converted into the converted second key information, i.e., the descramble key information, by the second key information converter 312 by the use of the reference data contained in the main data. Then, the descramble key information is outputted to the data descrambler 306. Furthermore, the main data inputted to the data descrambler 306 is descrambled by using the descramble key information outputted from the key converter unit 310. Then, the descrambled main data is outputted to the third signal selector 307.

The third signal selector 307 receives the scramble flag selected by the second signal selector 303, counts the number of sector data therein, generates a select signal in accordance with the scramble flag and the count, and selectively outputs either the main data from the data descrambler 306 or the main data from the second signal selector 303 in accordance with the generated select signal. In accordance with the generated select signal, when the scramble flag is equal to "1" and the count of the number of sector data indicates the recording area for recording the non-scrambled data 163, the non-descrambled main data outputted from the second signal selector 303 is outputted from the third signal selector 307. On the other hand, when the scramble flag is equal to "1" and the count of the number of sector data indicates a storage area for scrambled data 164, the main data outputted from the data descrambler 306 is outputted from the third signal selector 307. In accordance with the generated select signal, when the scramble flag is equal to "0", the non-descrambled main data outputted from the second signal selector 303 is outputted from the third signal selector 307 regardless of the count of the number of sector data.

As mentioned above, the main data descrambled in accordance with the scramble flag and the count of the number of sector data is outputted from the descrambling circuit 208 to the AV decoder 209. The AV decoder 209 demultiplexes multiplexed compressed audio and video data, expands the audio and video data, and then outputs the expanded video and audio signals.

As described above, the preferred embodiment has the following particular advantageous effects.

First of all, the CPU 212 of FIG. 3, which is system control means of the optical disk reproducing apparatus 200 such as a DVD player or the like, reads in the content control information 134 such as information on the limit of the number of copies and information on downsampling control to be performed at the time of reproducing. Upon controlling the optical disk reproducing apparatus 200, the content control information can be easily referred to because the non-scrambled content control information is recorded.

The content control information 134, which is not scrambled from the above-mentioned viewpoint, is recorded. When the content control information 134 is tampered with, correct descramble key information cannot be generated because of the provision of the key converter unit 310. Therefore, unauthorized reproducing can be prevented.

The content data, which is easy to change in a unit of sector, is used for obtaining the scramble key information from the second cipher key information by the use of the content control information 134. Thus, even if the content control information 134 is recorded in a unit of the abovementioned file as shown in FIG. 1 and the second cipher key information is recorded in a unit of disk, the intensity of the protection of contents by scrambling can be improved because the scramble key information changes sector by sector.

Second Preferred Embodiment

Figure 5:
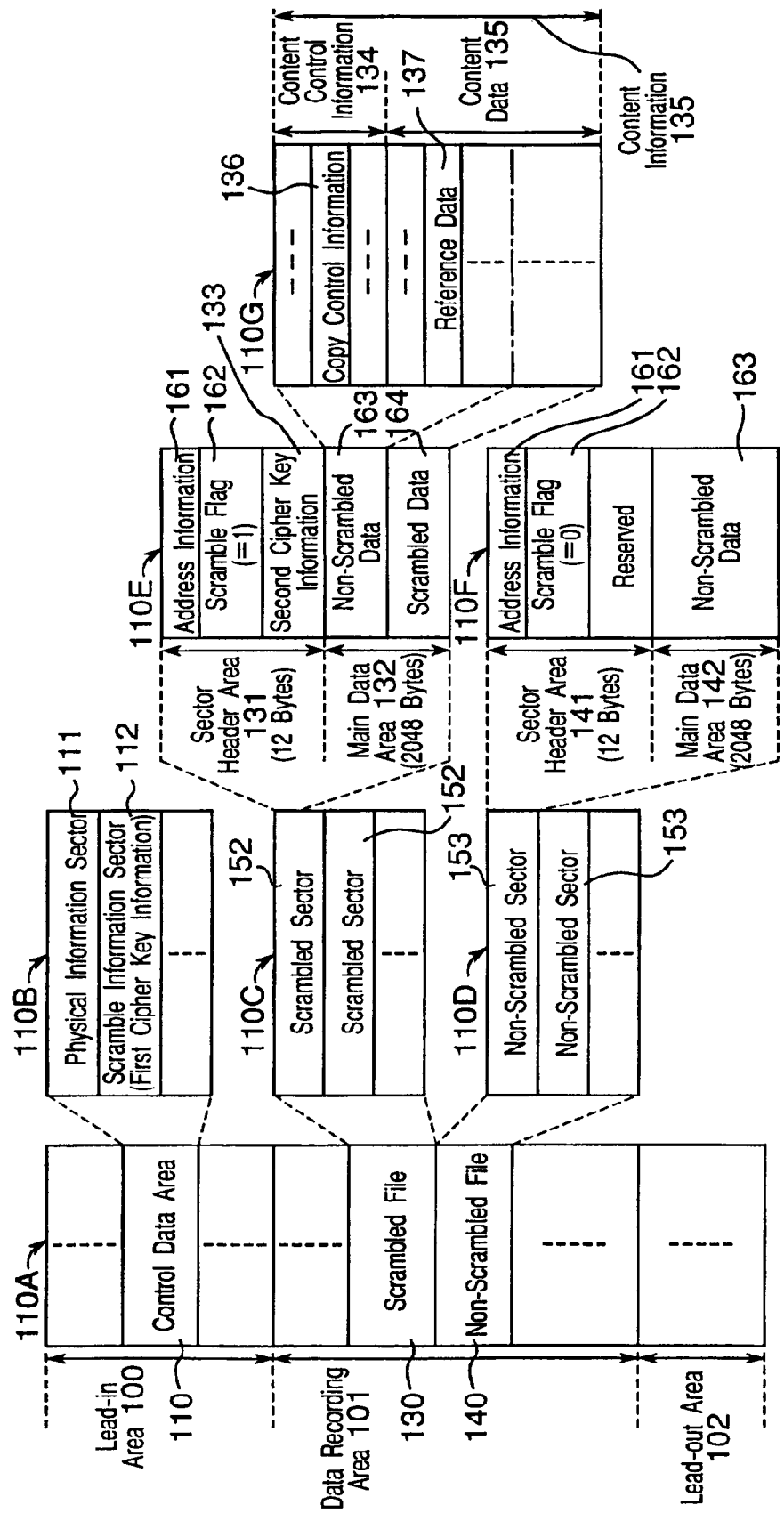
FIG. 5 is a hierarchy diagram showing a data structure of the optical disk 201 according to a second preferred embodiment of the present invention.
Figure 6:
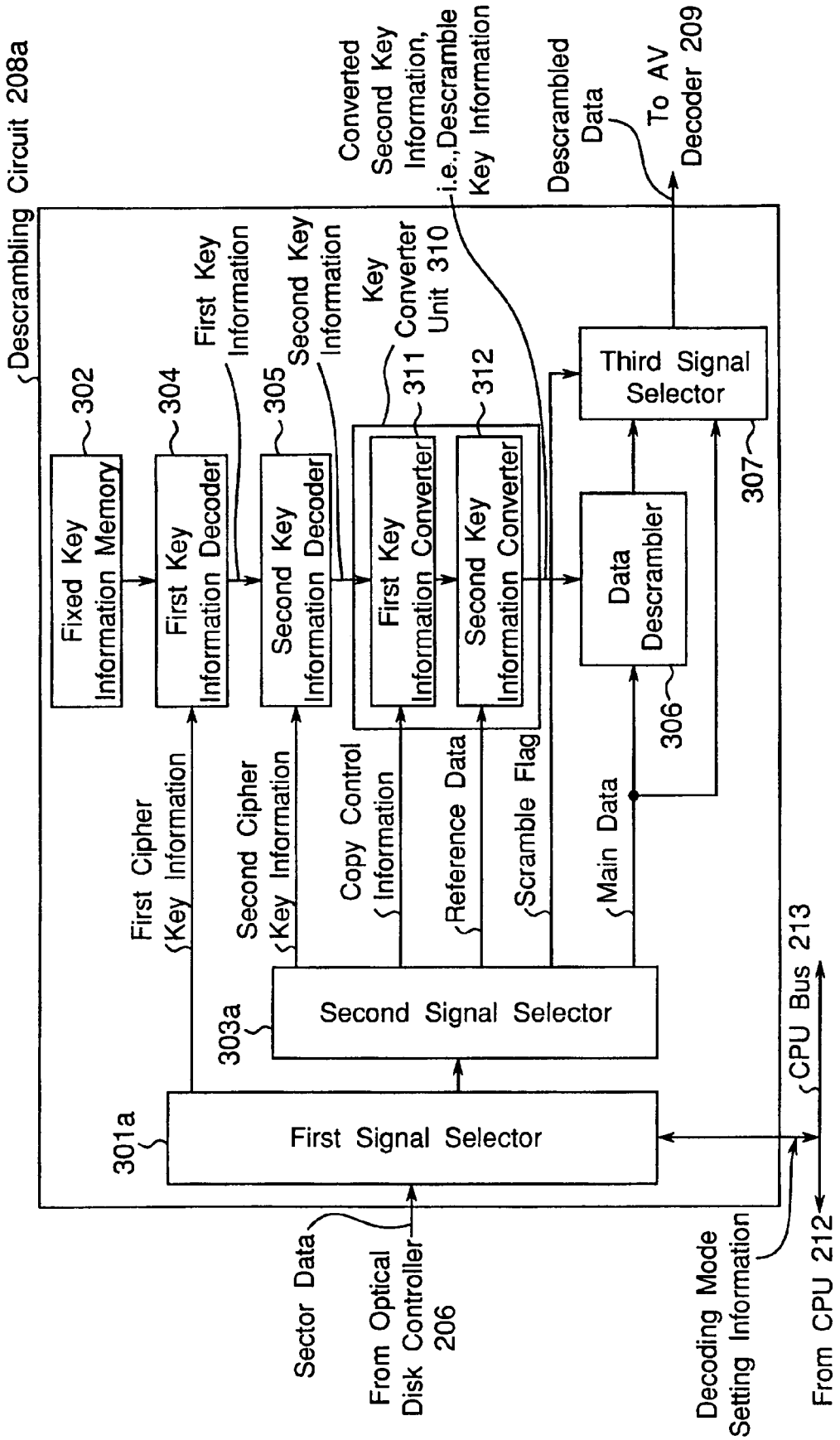
FIG. 6 is block diagram showing an internal configuration of a descrambling circuit 208a for use in the second preferred embodiment.

FIG. 5 is a hierarchy diagram showing a data structure of the optical disk 201 according to a second preferred embodiment of the present invention, and FIG. 6 is block diagram showing an internal configuration of a descrambling circuit 208a for use in the second preferred embodiment. In FIGS. 5 and 6, the same components as those shown in FIGS. 1 and 4 are indicated by the same reference numerals. The data structure of the optical disk 201 according to the second preferred embodiment and the configuration and operation of the descrambling circuit 208a, more particularly, a difference between the first and second preferred embodiments will be described in detail below.

In the first preferred embodiment, the first cipher key information is stored as the scramble information file 120 in the data recording area 101, as shown in FIG. 1. In the second preferred embodiment, the first cipher key information is stored in a scramble information sector 112 in the control data area 110 in the lead-in area 100, as shown in FIG. 5. In the first preferred embodiment, the second cipher key information is stored in the sector 150 for storing second cipher key information stored in the control data area 110 of the lead-in area 100, as shown in FIG. 1. In the second preferred embodiment, the second cipher key information is stored together with the address information and the scramble flag in the sector header area 131 of the scrambled sector 152 of the scrambled file 130 in the data recording area 101, as shown in FIG. 5.

The optical disk reproducing apparatus 200 for reproducing information recorded in the optical disk 201 configured as described above will be described with reference to FIG. 6. The second preferred embodiment is characterized in that the descrambling circuit 208 shown in FIG. 4 is replaced with the descrambling circuit 208a shown in FIG. 6. Specifically, the descrambling circuit 208a shown in FIG. 6 differs from the descrambling circuit 208 shown in FIG. 4 in the following respects.

(a) The first signal selector 301 is replaced with a first signal selector 301a. The second signal selector 303 is replaced with a second signal selector 303a.

(b) In the descrambling circuit 208 shown in FIG. 4, the first cipher key information is selected by the first and second signal selectors 301 and 303, and then is outputted to the first key information decoder 304. However, in the descrambling circuit 208a shown in FIG. 6, the first cipher key information is selected by the first signal selector 301a, and then is outputted to the first key information decoder 304.

(c) In the descrambling circuit 208 shown in FIG. 4, the second cipher key information is selected by the first signal selector 301, and then is outputted to the second key information decoder 305. However, in the descrambling circuit 208a shown in FIG. 6, the second cipher key information is selected by the first and second signal selectors 301a and 303a, and then is outputted to the second key information decoder 305.

In other words, the descrambling circuit 208a shown in FIG. 6 decodes the first cipher key information which is recorded in the scramble information sector 112 of the lead-in area 100 and inputted from the optical disk controller 206. Moreover, the descrambling circuit 208a decodes the second cipher key information and descrambles the main data in order to process the sector data having the data structure indicated by reference numeral 110C in FIG. 5.

Next, an operation of the descrambling circuit 208a, more particularly, a difference between the descrambling circuit 208a and the descrambling circuit 208 according to the first preferred embodiment shown in FIG. 4 will be described in detail with reference to FIG. 6.

When input data is the first cipher key information recorded in the scramble information sector 112 in the control data area 110 in the lead-in area 100, the first signal selector 301a outputs the input first cipher key information to the first key information decoder 304. On the other hand, when input data is the sector data recorded in the data recording area 101, the first signal selector 301a outputs the input sector data to the second signal selector 303a. Subsequently, the sector data outputted from the first signal selector 301a is inputted to the second signal selector 303a. The second signal selector 303a selects a circuit to which the sector data is to be outputted, in accordance with the location of the sector data in the sector, i.e., the count of the number of sector data. As shown in FIG. 1, the type of the sector data recorded in the data recording area 101 is determined in accordance with the location of the sector data in the sector. Thus, in accordance with the count of the number of sector data, as shown in FIG. 6, the second signal selector 303a performs the operation of:

(a) outputting the input second cipher key information to the second key information decoder 305 when the input sector data is the second cipher key information;

(b) outputting the input copy control data to the first key information converter 311 of the key converter unit 310 when the input sector data is the copy control data;

(c) outputting the input reference data to the second key information converter 312 of the key converter unit 310 when the input sector data is the reference data;

(d) outputting the input scramble flag to the third signal selector 307 when the input sector data is the scramble flag; or (e) outputting the input main data to the data descrambler 306 and the third signal selector 307 when the input sector data is the main data.

An operation of the optical disk reproducing apparatus 200 according to the preferred embodiment configured as described above will be described with reference to FIGS. 3 and 6. In FIG. 3, the descrambling circuit 208 is replaced by the descrambling circuit 208a.

When the optical disk 201 is inserted into the optical disk reproducing apparatus 200 at power-on, or when the optical disk 201 is newly inserted into the optical disk reproducing apparatus 200, the optical disk reproducing apparatus 200 executes decoding of the first cipher key information recorded in the scramble information sector 112 in the control data area 110 in the lead-in area 100. The CPU 212 controls the servo controller 211 so that information data in the scramble information sector 112 in the control data area 110 in the lead-in area 100 may be read out from the optical disk 201 by using the optical head 203. An electric signal of the readout information data is amplified, demodulated and subjected to error correction by the head amplifier 204, the analog processor 205 and the optical disk controller 206, respectively. Then, the information data subjected to error correction is stored in the error correction memory 207. Moreover, the CPU 212 sets the mode of decoding the first cipher key information as the decoding mode setting information for the descrambling circuit 208*a*. The CPU 212 controls the optical disk controller 206 and the descrambling circuit 208*a* so that the data on the first cipher key information subjected to error correction in the scramble information sector 112 may be transferred from the optical disk controller 206 to the descrambling circuit 208*a*.

The mode of decoding the first cipher key information is set in the descrambling circuit 208*a*. Thus, the input data on the first cipher key information stored in the scramble information sector 112 is transferred to the first key information decoder 304 by the first signal selector 301*a*. The transferred first cipher key information is decoded into the first key information by the first key information decoder 304 using the fixed key information read out from the fixed key information memory 302. Then, the first key information is outputted to the second key information decoder 305. In the mode of decoding the first cipher key information, no data is outputted from the descrambling circuit 208*a*.

Next, an operation of selecting a file in accordance with operation by an apparatus user or the like, and then reproducing a video signal and an audio signal will be described.

The CPU 212 controls the servo controller 211, the optical head 203, the analog processor 205 and the optical disk controller 206, thereby reading out desired information data from the optical disk 201, and then causing the error correction memory 207 to store the information data subjected to error correction. Moreover, the CPU 212 sets the mode of descrambling data for the descrambling circuit 208*a*. The CPU 212 sets information data required for the AV decoder 209, and then controls the error correction memory 207 to transfer the information data subjected to error correction to the descrambling circuit 208*a*.

In the descrambling circuit 208*a*, the mode of descrambling data is set as the decoding mode setting information. Thus, the input sector data is transferred to the second signal selector 303*a* by the first signal selector 301*a*. The second signal selector 303*a* counts the number of input sector data and selectively outputs the input sector data in accordance with the count in the following manner.

(a) When the above-mentioned count indicates second cipher key information 133 in the sector header area 131, the second cipher key information 133 in the sector data is outputted to the second key information decoder 305.

(b) When the above-mentioned count indicates the data location containing the copy control information 136, the copy control information 136 in the sector data is outputted to the first key information converter 311.

(c) When the above-mentioned count indicates the data location containing the reference data 137, the reference data 137 in the sector data is outputted to the second key information converter 312.

(d) When the above-mentioned count indicates the data location containing the main data, the main data is outputted to the data descrambler 306 and the third signal selector 307.

The second cipher key information inputted to the second key information decoder 305 is decoded into the second key information by using as a key the first key information outputted from the first key information decoder 304. The second key information obtained through decoding is outputted to the first key information converter 311 of the key converter unit 310.

Subsequently, the second key information obtained through decoding is converted into the second key information subjected to first key information conversion by the first key information converter 311 by the use of the copy control information 136 contained in the main data. Then, the converted second key information is outputted to the second key information converter 312. The second key information subjected to first key information conversion is converted into the converted second key information by the second key information converter 312 by the use of the reference data contained in the main data. The converted second key information is outputted as the descramble key information to the data descrambler 306. Then, the main data inputted to the data descrambler 306 is descrambled by using the descramble key information outputted from the second key information converter 312 of the key converter unit 310. Then, the descrambled main data is outputted to the third signal selector 307.

Subsequently, the third signal selector 307 selects either the non-descrambled main data outputted from the second signal selector 303*a* or the descrambled main data outputted from the data descrambler 306 in accordance with the scramble flag outputted from the second signal selector 303*a* and the count of the number of sector data counted in the third signal selector 307. Then, the third signal selector 307 outputs the selected main data to the AV decoder 209. When the scramble flag is equal to "1" and the count does not indicate the storage area for the non-scrambled data 163, i.e., when the main data is scrambled, the third signal selector 307 selects the descrambled main data outputted from the data descrambler 306, and outputs the descrambled main data to the AV decoder 209. On the other hand, when the scramble flag is equal to "1" and the count indicates the storage area for the non-scrambled data 163, or when the scramble flag is equal to "0", i.e., when the main data is not scrambled, the third signal selector 307 selects the non-descrambled main data outputted from the second signal selector 303*a*, and outputs the non-descrambled main data to the AV decoder 209.

In the preferred embodiment, the second cipher key information may be stored in one scrambled sector 152, or a plurality of data into which the second cipher key information is divided may be stored in the scrambled files 130 of a plurality of scrambled sectors 152.

As described above, according to the second preferred embodiment, in addition to the advantageous effects of the first preferred embodiment, the second cipher key information can be recorded in a unit of sector or file. Thus, the second cipher key information can be changed in a unit of sector or file. Therefore, the intensity of copyright protection by scrambling can be further improved.

Modified Preferred Embodiments

In the above-mentioned preferred embodiments, the description is given with regard to the optical disk, the method of reproducing information recorded in the optical disk and the apparatus for reproducing information recorded in the optical disk. However, the present invention is not limited to this. The present invention can be applied to an information recording medium including a magnetic recording medium such as a floppy disk and a memory such as a flash memory, an EPROM or an EEPROM, a method of reproducing information recorded in the information recording medium and an apparatus for reproducing information recorded in the information recording medium.

In the above-described preferred embodiments, a scrambled and recorded part of the content information 138 is obtained through scrambling using the scramble key information, which is obtained by converting the first and second cipher key information by the use of a non-scrambled part of the content information 138. However, the present invention is not limited to this. A scrambled and recorded part of the content information 138 may be obtained through scrambling using the scramble key information, which is obtained by converting at least one of the first and second cipher key information by the use of a non-scrambled part of the content information 138.

In the above-described preferred embodiments, the apparatus comprises the first and second key information decoders 304 and 305. However, the present invention is not limited to this. The apparatus may comprise at least one of the first and second key information decoders 304 and 305. When the apparatus comprises only the first key information decoder 304, the first key information obtained through decoding by the first key information decoder 304 is outputted to the key converter unit 310. When the apparatus comprises only the second key information decoder 305, the second key information decoder 305 decodes the second cipher key information into the second key information by using the fixed key information read out from the fixed key information memory 302, and then outputs the second key information to the key converter unit 310.

In the above-described preferred embodiments, the key converter unit 310 comprises the first and second key information converters 311 and 312. However, the present invention is not limited to this. The key converter unit 310 may comprise at least one of the first and second key information converters 311 and 312. That is, the second key information, which is obtained through decoding by the second key information decoder 305 and outputted from the second key information decoder 305, is converted by using a part of the content information 138, e.g., at least one of the copy control information 136 and the reference data 137, and the converted second key information may be used as the descramble key information.

In the above-described preferred embodiments, each of the key information decoders 304 and 305 decodes predetermined cipher key information into key information obtained through decoding, by using predetermined key information. However, the present invention is not limited to this. Each of the key information decoders 304 and 305 may convert predetermined cipher key information into converted cipher key information by utilizing a predetermined transform equation by the use of predetermined key information.

In the above-described preferred embodiments, each of the key information converters 311 and 312 converts predetermined cipher key information into converted cipher key information by utilizing a predetermined transform equation by the use of predetermined information. However, the present invention is not limited to this. Each of the key information converters 311 and 312 may decode predetermined cipher key information into key information obtained through decoding, by using predetermined key information.

As described in detail above, according to the present invention, there is provided an information recording medium for recording at least copyrighted content information and cipher key information, and in the above-mentioned information recording medium, a part of the content information is scrambled and recorded, and the scrambled and recorded part of the content information is obtained through scrambling using scramble key information which is obtained by converting the cipher key information by the use of a non-scrambled part of the content information. Therefore, the present invention has the following particular advantageous effects.

System control means of an information reproducing apparatus, such as a DVD player or the like, reads in a part of the content information, which is the content control information such as information on the limit of the number of copies and information on downsampling control to be performed at the time of reproducing. Upon controlling the information reproducing apparatus, the content control information can be easily referred to because the non-scrambled content control information is recorded.

Moreover, a part of the content information, such as the content control information, is not scrambled and is recorded. When a part of the content information, such as the content control information, is tampered with, correct descramble key information cannot be generated. Therefore, unauthorized reproducing can be prevented.

Furthermore, the content data, which is easy to change in a unit of sector, is used for obtaining the scramble key information from the cipher key information by the use of a part of the content information, such as the content control information or the like. Thus, even if a part of the content information, such as the content control information or the like, is recorded in a unit of file and the cipher key information is recorded in a unit of disk, the intensity of protection of contents by scrambling can be improved because the scramble key information changes sector by sector.

Furthermore, non-scrambled data is used as the reference data to generate the scramble key information. Thus, for example, even if the cipher key information or the copy control information is set in a unit of file, the scramble key information changes in a unit of sector. Therefore, an effect of being resistant to piracy is achieved.

Furthermore, when the cipher key information is recorded in a unit of sector or file, the cipher key information can be changed in a unit of sector or file. Therefore, the intensity of copyright protection by scrambling can be further improved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information recording medium for recording scrambled data from a recording device including scrambled key information, the information recording medium comprising:

cipher key information that is scrambled and prestored on the information recording medium;

non-scrambled data including copy control information that is not scrambled, from content data which is acquired from an entity other than the information recording medium; and the scrambled data obtained by scrambling the contents data using the scrambled key information, wherein the scrambled key information is generated in the recording device from at least the cipher key information that is read from the information recording medium and unscrambled by the recording device, and the copy control information.

2. A method for recording information, the method comprising:

reading cipher key information that is scrambled and prestored on an information recording medium from the information recording medium to a recording device;

reading copy control information that is not scrambled, from content data which is acquired from an entity other than the information recording medium;

generating scrambled key information using at least the cipher key information that is unscrambled by the recording device and the copy control information;

scrambling the content data using the scrambled key information to obtain scrambled content data; and recording the scrambled content data and the unscrambled copy control information onto the information recording medium.

3. A method for reproducing information, the method comprising:

reading from an information recording medium copy control information that is not scrambled, scrambled content data, and cipher key information that is scrambled and prestored on the information recording medium, a recording device having read and descrambled the cipher key information from the information recording medium to create the scrambled content data;

generating descrambled key information using at least the cipher key information that is unscrambled and the copy control information; and descrambling the scrambled content data using the descrambled key information to obtain content data, wherein the copy control information is stored onto the information recording medium from the content data which is acquired from an entity other than the information recording medium.

* * * * *